United States Patent
Park

(10) Patent No.: US 8,106,555 B2
(45) Date of Patent: Jan. 31, 2012

(54) SPINDLE MOTOR AND APPARATUS FOR INHIBITING OIL LEAKAGE IN SPINDLE MOTOR

(75) Inventor: Jae Hyun Park, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 193 days.

(21) Appl. No.: 12/554,058

(22) Filed: Sep. 4, 2009

(65) Prior Publication Data

US 2010/0060095 A1 Mar. 11, 2010

(30) Foreign Application Priority Data

Sep. 8, 2008 (KR) .................. 10-2008-0088241

(51) Int. Cl.
*H02K 5/16* (2006.01)
*F16C 32/06* (2006.01)
(52) U.S. Cl. ............... 310/90; 360/99.04; 360/99.07; 360/99.08; 384/100; 384/107; 384/112

(58) Field of Classification Search .................. 310/45, 310/67 R, 90; 360/99.04, 99.07, 99.08; 384/100, 384/107, 111–114, 118–119, 120–124, 279
See application file for complete search history.

(56) References Cited

U.S. PATENT DOCUMENTS

| | | | |
|---|---|---|---|
| 6,435,722 B1* | 8/2002 | Horng | 384/279 |
| 6,513,979 B2* | 2/2003 | Mori et al. | 384/107 |
| 7,025,505 B2* | 4/2006 | Komori et al. | 384/107 |
| 7,048,444 B2* | 5/2006 | Kurimura et al. | 384/119 |
| 7,608,957 B2* | 10/2009 | Yun | 310/90 |
| 2003/0113045 A1* | 6/2003 | Fujinaka | 384/100 |
| 2005/0220379 A1* | 10/2005 | Yazawa et al. | 384/100 |
| 2007/0253652 A1* | 11/2007 | Shishido et al. | 384/107 |
| 2008/0036319 A1* | 2/2008 | Chiyoda et al. | 310/90 |

* cited by examiner

*Primary Examiner* — Tran Nguyen
(74) *Attorney, Agent, or Firm* — Saliwanchik, Lloyd & Eisenschenk

(57) ABSTRACT

An apparatus for inhibiting oil leakage is disclosed by which the oil leakage can be effectively inhibited with a simple structure, where the apparatus is extensively formed along an outer periphery of a rotation shaft at a position higher than at least an upper end of a bearing and is formed with an oil barrier that restrains oil rise.

14 Claims, 3 Drawing Sheets

SPINDLE MOTOR AND APPARATUS FOR INHIBITING OIL LEAKAGE IN SPINDLE MOTOR

CROSS-REFERENCE TO RELATED APPLICATION

This application claims the benefit under Korean Application No. 10-2008-0088241, filed Sep. 8, 2008, which is hereby incorporated by reference in its entirety.

BACKGROUND

The present disclosure relates to a spindle motor and an apparatus for inhibiting oil leakage in the spindle motor.

A spindle motor performs the function of rotating a disk to enable an optical pickup which linearly reciprocates in an optical disk drive (ODD) to read data recorded on the disk.

A turn table on which an optical disk is accommodated and metal bearings impregnated with oil for lubricating a rotation shaft are largely used in the spindle motor, where a high lubricating performance of bearings is required in association with a trend calling for a high speed of an optical apparatus, and a shaft trembling of a rotation shaft or a run-out caused by a gap between the rotation shaft and the bearing or wear-out of the bearing must be reduced to a minimum in order to cope with DVD having a narrow track width and blue ray disk. Furthermore, a spindle motor having a structure that is capable of inhibiting an erroneous operation of an optical apparatus caused by oil leakage is also required.

BRIEF SUMMARY

An object of the present disclosure is to provide an apparatus for inhibiting oil leakage in a spindle motor having a simple structure and yet capable of effectively inhibiting oil leakage in a spindle motor.

In an exemplary embodiment of the present disclosure, the object may be accomplished by an apparatus for inhibiting oil leakage in a spindle motor comprising: a bearing housing; a bearing press-fitted into the bearing housing and impregnated with oil; a rotation shaft rotatably installed inside the bearing; and an oil barrier continuously formed along a periphery of the rotation shaft at a position higher than at least an upper end of a bearing for inhibiting oil rising along the rotation shaft from leaking.

In an exemplary embodiment of the present disclosure, the object may be accomplished by a spindle motor, comprising: a bearing housing; a bearing press-fitted into the bearing housing and impregnated with oil; a rotation shaft rotatably installed inside the bearing; and an oil barrier coated with a coating material having a smaller surface energy than that of the oil, wherein the coating material is coated on a periphery of the rotation shaft along a radial direction of the rotation shaft for inhibiting oil from moving along the periphery of the rotation shaft.

Another aspect of the present disclosure is to provide an apparatus for inhibiting oil leakage in a spindle motor that is still applied with the conventional structure but that is capable of reliably inhibiting oil leakage in a spindle motor.

In an exemplary embodiment of the present invention, the object may be accomplished by an apparatus for inhibiting oil leakage in a spindle motor having an oil barrier restraining oil rise by being continuously formed along an outer periphery of a rotation shaft at a position higher than at least an upper end of a bearing in order to inhibit oil rising along the rotation shaft in the spindle motor, where an oil-impregnated bearing is press-fitted into a bearing housing and the bearing is rotatably and supportively installed therein with an outer periphery of the rotation shaft.

In an exemplary embodiment of the present invention, another object may be accomplished by an apparatus for inhibiting oil leakage in a spindle motor, comprising: an oil stopper press-fitted into an outer periphery of a rotation shaft from an upper side of the bearing; and an oil barrier extensively formed to a rear surface of the oil stopper and an outer periphery of the rotation shaft along a border between the oil barrier and the outer periphery of the rotation shaft for restraining the oil rise in the spindle motor, where an oil-impregnated bearing is press-fitted into a bearing housing and the bearing is rotatably and supportively installed therein with an outer periphery of the rotation shaft.

In an exemplary embodiment of the present invention, still another object may be accomplished by an apparatus for inhibiting oil leakage in a spindle motor, comprising: oil barrier extensively formed from an upper side of the bearing along an outer periphery of a rotation shaft for restraining the oil rise; and an oil rise restraining groove extensively formed from any one position of an upper portion or a lower portion of the oil barrier along an outer periphery of the rotation shaft in the spindle motor where an oil-impregnated bearing is press-fitted into a bearing housing and the bearing is rotatably and supportively installed therein with an outer periphery of the rotation shaft.

DETAILED DESCRIPTION

Figure 1:
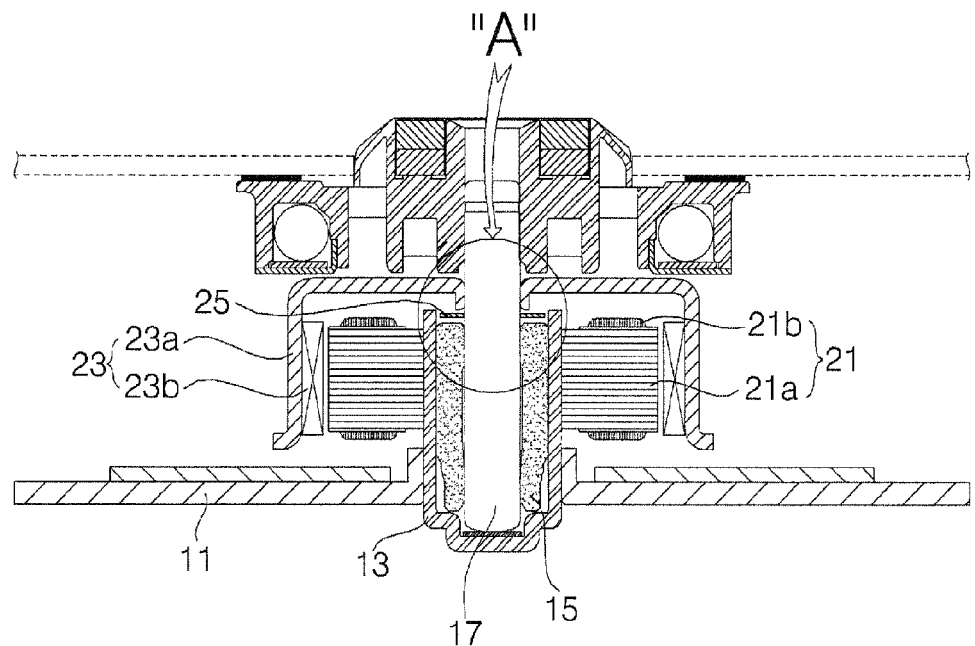
FIG. 1 is a cross-sectional view illustrating a spindle motor in an imaginary exemplary embodiment for comparing with the present disclosure.
Figure 1A:
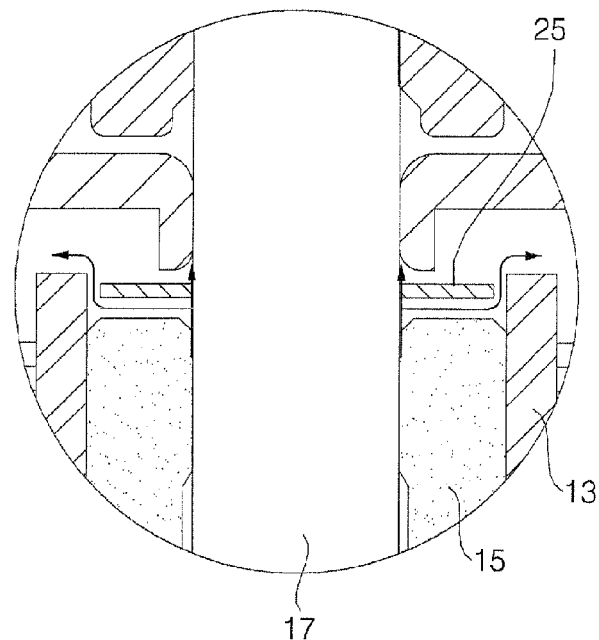
FIG. 1a is an enlarged view of "A" part of FIG. 1.

FIG. 1 is a cross-sectional view illustrating a spindle motor in an imaginary exemplary embodiment for comparing with the present disclosure, and FIG. 1a is an enlarged view of "A" part of FIG. 1.

Referring to FIGS. 1 and 1a, a bearing housing 13 is vertically installed at a base 11. The bearing housing 13 is press-fitted therein by an oil-impregnated bearing 15 and the bearing is supportively and rotatably installed therein with an outer periphery of the rotation shaft 17.

The bearing housing 13 is fixed at an outer surface thereof by a stator 21 having a core 21a and a coil 21b, and a rotation shaft 17 portion exposed to an upper side of the bearing housing 13 is fixed by a rotor 23 having a rotor yoke 23a and a magnet 23b.

In the aforementioned configuration, if a current is applied to the coil 21b, the rotor 23 is rotated by interaction between the stator 21 and the rotor 23, whereby the rotation shaft 17 is rotated.

In a case the rotation shaft 17 is rotated, oil in a bearing 15 is oozed out by the centrifugal force due to load acting on from the rotation shaft to the bearing 15, where the leaked oil rises along the outer periphery of the rotation shaft 17 to be leaked out to an upper outside of the bearing housing 13.

In order to prevent the oil from leaking, an oil stopper 25 is press-fitted into the outer periphery of the rotation shaft 17 at an upper side of the bearing 15, as shown in FIG. 1a. However, there is a drawback of leaking oil through a fine gap formed between a rotation shaft and an oil stopper due to material difference of the oil stopper that is conventionally made of polyester.

There is another drawback of leaking oil due to deformation at an inner periphery side of the oil stopper during press-fitting when the oil stopper is press-fitted into the rotation shaft and due to subsequent generation of a gap at a contact area between the oil stopper and the rotation shaft. The oil leakage results in shortened life of the spindle motor.

Figure 2:
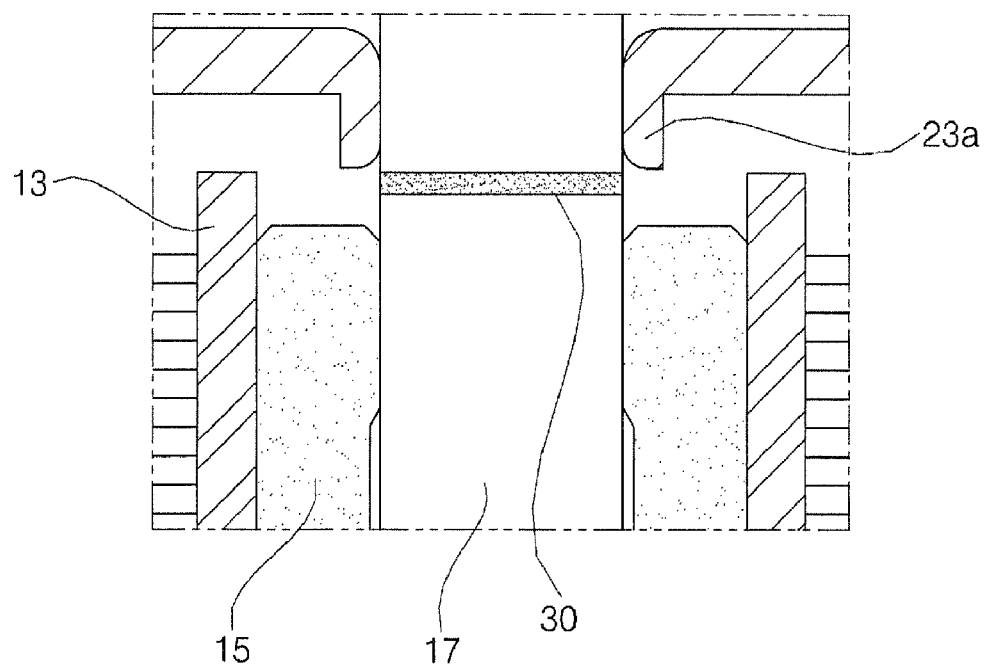
FIG. 2 is an apparatus for inhibiting oil leakage in a spindle motor according to a first exemplary embodiment of the present invention.

The present disclosure intends to mitigate the aforementioned drawbacks, and FIG. 2 illustrates an apparatus for inhibiting oil leakage in a spindle motor according to a first exemplary embodiment of the present disclosure.

Referring to FIG. 2, an oil stopper is eliminated and a place where the oil stopper is eliminated is formed with an oil barrier 30. To be more specific, an oil barrier 30 is continuously formed along an outer surface of the rotation shaft 17 at a position higher than at least an upper end of a bearing 15 to thereby restrain an oil rise.

Preferably, the oil barrier 30 is formed with fluoro particles-dispersed paste and the paste is cure, where a surface energy of the oil barrier 30 is smaller than that of oil. The paste where the fluoro particles are dispersed in flammable solution is coated on the rotation shaft 17, and when the flammable solution is volatilized, only the fluoro particles remain to be adhered to the rotation shaft 17. The fluoro particles have a low surface energy to have a large contact angle, such that the particles adhere to the rotation shaft 17 in a substantially sphere-shaped pattern. That is, a surface formed by the fluoro particles is actually increased when compared with a case having a smaller contact angle to resultantly expand an actual surface area of the oil barrier 30.

Oil conventionally used for a motor is silicone oil having a low surface tension is prone to be detached from the rotation shaft 17. However, the oil that has risen along a gap between the bearing 15 and the rotation shaft 17 rises above the oil barrier 30 and is difficult to be detached from the rotation shaft 17 as a contact area with the fluoro particles in the oil barrier 30 increases. As a result, the oil that has risen above the oil barrier 30 is gradually accumulated and increased in size thereof while being brought into contact with the fluoro particles.

The oil that has increased in size drops by its own weight to seep into a gap between the bearing 15 and the rotation shaft 17, or splashed by the centrifugal force. However, even in the case of splash of the oil, an splash angle of the oil is decreased by its own weight to inhibit the bearing housing 13 from being fallen.

Figure 3:
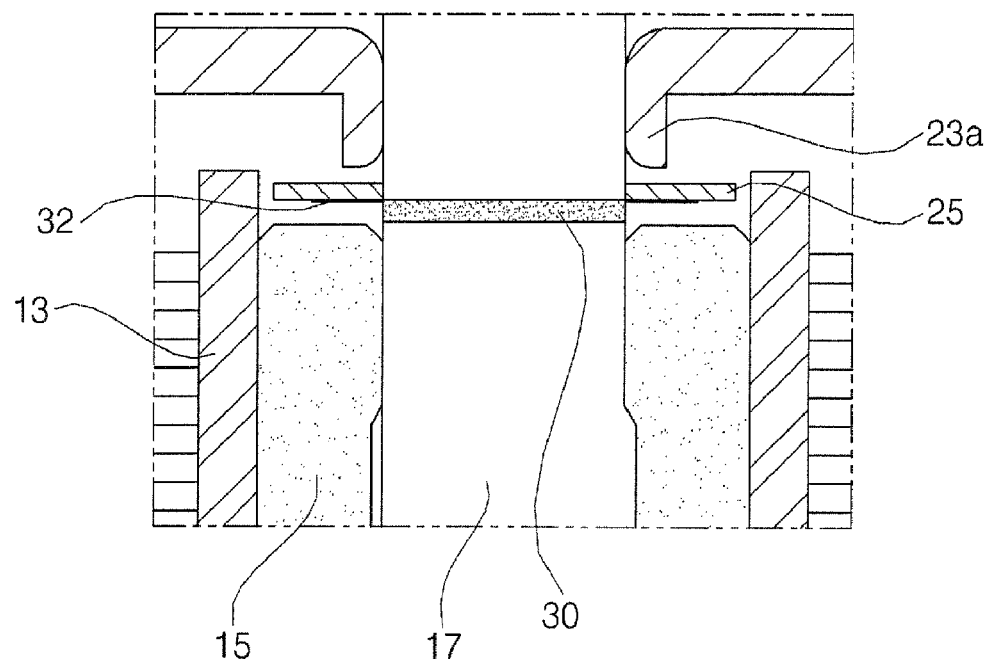
FIG. 3 is an apparatus for inhibiting oil leakage in a spindle motor according to a second exemplary embodiment of the present invention.

FIG. 3 is an apparatus for inhibiting oil leakage in a spindle motor according to a second exemplary embodiment of the present invention.

In the second exemplary embodiment of the present invention, oil barriers 30, 32 are extensively formed to a rear surface of the oil stopper 25 and an outer periphery of the rotation shaft 17 along a border between the oil stopper 25 and the outer periphery of the rotation shaft 17 while the oil stopper 25 is press-fitted into the outer periphery of the rotation shaft 17 from an upper side of the bearing 15.

According to second exemplary embodiment of the present invention, the oil barriers 30, 32 function in the same principle as that of the first exemplary embodiment of the present invention, and simultaneously serve to block the gap between the oil stopper 25 and the rotation shaft 17. That is, a border between the oil stopper 25 and the outer periphery of the rotation shaft 17 is physically and structurally blocked to prevent the oil from being leaked by the oil barrier 30 at a portion extended to the outer periphery of rotation shaft 17 and by the oil barrier 32 at a portion extended to the rear surface of the oil stopper 25 about the border between the oil stopper 25 and the rotation shaft 17. The structure thus mentioned has a disadvantage of applying an oil stopper 25 but has a greater advantage of fundamentally blocking the oil leakage.

Figure 4:
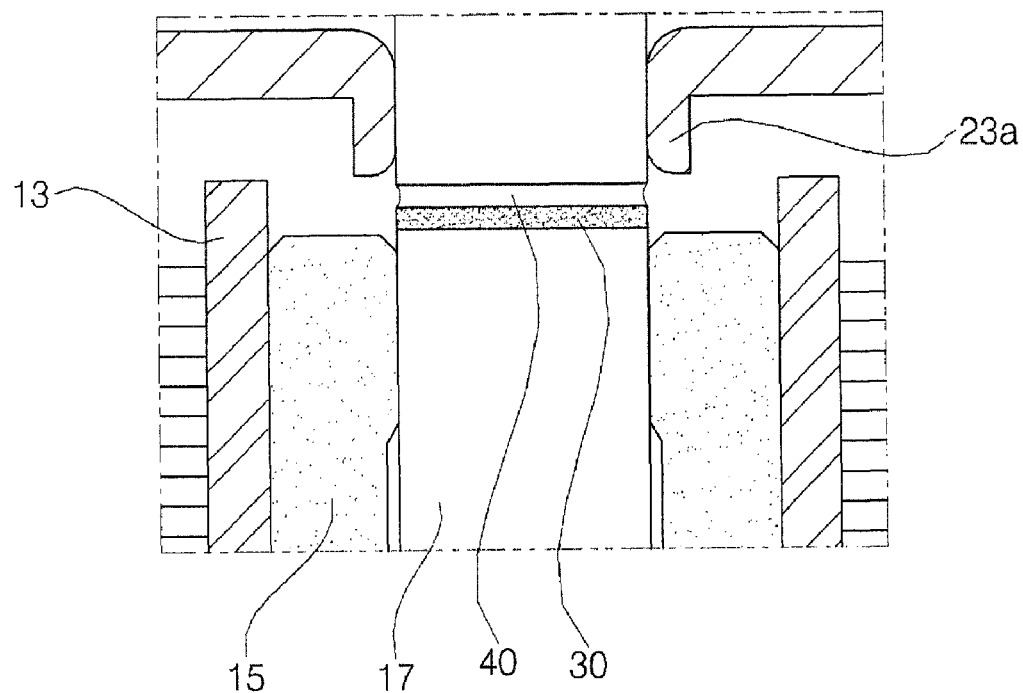
FIG. 4 is an apparatus for inhibiting oil leakage in a spindle motor according to a third exemplary embodiment of the present invention where an oil barrier is installed at a lower side of an oil rise restraining groove.

FIG. 4 is an apparatus for inhibiting oil leakage in a spindle motor according to a third exemplary embodiment of the present invention where an oil barrier is installed at a lower side of an oil rise restraining groove.

According to the third exemplary embodiment of the present invention, an oil barrier 30 is extensively formed along the outer periphery of the rotation shaft 17, and an oil rise restraining groove 40 is continuously formed along the outer periphery of the rotation shaft 17 at an upper position of the oil barrier 30.

According to this structure, in a case the oil rises despite the formation of the oil barrier 30, the oil rise restraining groove 40 accommodates oil rising along the rotation shaft 17 to allow the oil to accumulate and to allow an own weight of oil to increase, such that the oil is not splashed but is allowed to flow down.

The oil rise restraining groove 40 may be positioned at a low side of the oil barrier 30 or be overlapped with the oil barrier 30 unlike the third exemplary embodiment.

Figure 5:
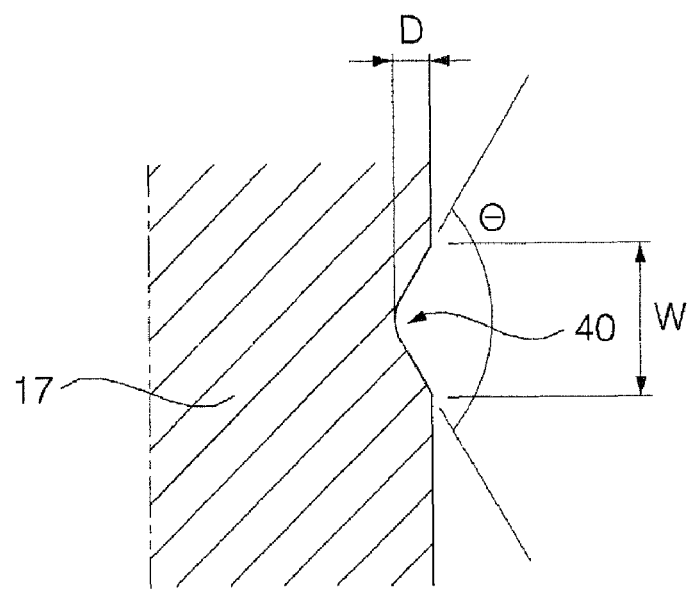
FIG. 5 is an exemplary embodiment defining a detailed dimension of an oil rise restraining groove (40).

FIG. 5 is an exemplary embodiment defining a detailed dimension of an oil rise restraining groove 40.

Referring to FIG. 5, the oil rise restraining groove 40 may form a cross-section in which an angle is widened to 100 to 140 degrees about a minimum position. The minimum position of the oil rise restraining groove 40 is preferably positioned between an upper end of the bearing 15 and an upper end of the bearing housing 13, and a width W and a depth D of the oil rise restraining groove 40 are preferably within a range of 0.3 mm~0.5 mm and 0.05 mm~0.35 mm respectively.

There is an advantage in the apparatus for inhibiting oil leakage according to the third exemplary embodiment of the present invention in that the oil leakage can be effectively inhibited with a simple structure. Furthermore, the oil leakage can be reliably inhibited using the conventional structure as it is.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. An apparatus for inhibiting oil leakage in a spindle motor comprising:
    a bearing housing;
    a bearing press-fitted into the bearing housing and impregnated with oil;
    a rotation shaft rotatably installed inside the bearing;
    an oil stopper in contact with the rotation shaft;
    and an oil barrier continuously formed along a periphery of the rotation shaft at a position higher than at least an upper end of a bearing for inhibiting oil rising along the rotation shaft from leaking, wherein the oil barrier is positioned below an upper surface of the oil stopper.

2. The apparatus of claim 1, wherein the oil barrier is formed with fluorine particles-dispersed paste, where the paste is cured.

3. The apparatus of claim 1, wherein surface energy of the oil barrier is smaller than that of oil.

4. The apparatus of claim 1, wherein the oil stopper is provided at an upper surface of the oil barrier, where the oil stopper is press-fitted into an outer periphery of the rotation shaft, and the oil barrier is extensively formed to a rear surface of the oil stopper and the outer periphery of the rotation shaft along a border between the oil stopper and the outer periphery of the rotation shaft.

5. The apparatus of claim 1, further comprising an oil rise restraining groove extensively formed along the outer periphery of the rotation shaft, where the oil rise restraining groove is separately positioned at a low or an upper side of the oil barrier, or overlapped with the oil barrier.

6. The apparatus of claim 5, wherein the oil rise restraining groove forms a cross-section in which an angle is widened to 100 to 140 degrees about a minimum position of the oil rise restraining groove.

7. The apparatus of claim 6, wherein the minimum position of the oil rise restraining groove is positioned between an upper end of the bearing and an upper end of the bearing housing.

8. The apparatus of claim 6, wherein width of the oil rise restraining groove is in the range of 0.3 mm~0.5 mm.

9. The apparatus of claim 6, wherein depth of the oil rise restraining groove is in the range of 0.05 mm~0.35 mm.

10. A spindle motor, comprising:
    a bearing housing;
    a bearing press-fitted into the bearing housing and impregnated with oil;
    a rotation shaft rotatably installed inside the bearing;
    an oil stopper in contact with the rotation shaft;
    and an oil barrier coated with fluorine particles having a smaller surface energy than that of the oil,
    wherein the fluorine particles are coated on a periphery of the rotation shaft along a radial direction of the rotation shaft for inhibiting oil from moving along the periphery of the rotation shaft, and
    wherein the oil barrier is positioned below an upper surface of the oil stopper.

11. The spindle motor of claim 10, wherein the oil stopper is press-fitted into an outer periphery of the rotation shaft exposed to a position higher than that of the oil barrier.

12. The spindle motor of claim 11, wherein a press-fitted position of the oil stopper and a formed position of the oil barrier are adjacent to such a degree that the oil barrier hermetically seals a part in which an inner periphery of the oil stopper and an outer periphery of the rotation shaft face each other.

13. The spindle motor of claim 10, further comprising an oil rise restraining groove on which part of the outer periphery of the rotation shaft is cut.

14. The spindle motor of claim 13, wherein the oil rise restraining groove is coated with the fluorine particles to allow the oil barrier and the oil rise restraining groove to be stacked.

* * * * *